US012608824B2

(12) United States Patent     (10) Patent No.:   US 12,608,824 B2

Huang     (45) Date of Patent:   Apr. 21, 2026

(54) POSITION ESTIMATION METHOD AND APPARATUS FOR TRACKING TARGET, AND UNMANNED AERIAL VEHICLE

(71) Applicant: AUTEL ROBOTICS CO., LTD., Shenzhen (CN)

(72) Inventor: Jinxin Huang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 518 days.

(21) Appl. No.: 18/173,935

(22) Filed: Feb. 24, 2023

(65) Prior Publication Data

US 2023/0215024 A1    Jul. 6, 2023

Related U.S. Application Data

(63) Continuation of application No. PCT/CN2021/108888, filed on Jul. 28, 2021.

(30) Foreign Application Priority Data

Aug. 31, 2020    (CN) ......................... 202010896152.X

(51) Int. Cl.
    *G06T 7/277*     (2017.01)
    *B64U 20/87*     (2023.01)
        (Continued)

(52) U.S. Cl.
    CPC .............. *G06T 7/277* (2017.01); *B64U 20/87* (2023.01); *G06T 7/62* (2017.01); *G06T 7/70* (2017.01);
        (Continued)

(58) Field of Classification Search
    CPC .. G06T 7/277; G06T 7/62; G06T 7/70; G06T 2207/10032; G06T 2207/30244;
        (Continued)

(56) References Cited

U.S. PATENT DOCUMENTS

2021/0025975 A1*   1/2021   Seeber ..................... G01S 7/415

FOREIGN PATENT DOCUMENTS

CN     108802707 A    11/2018
CN     110222581 A    9/2019
        (Continued)

OTHER PUBLICATIONS

International Search Report mailed Nov. 1, 2021; PCT/CN2021/108888.

(Continued)

*Primary Examiner* — Jerome Grant, II

(57) ABSTRACT

A position estimation method for a tracking target is implemented in an unmanned aerial vehicle. The position estimation method include: estimating a target position of the tracking target at the next time according to an initial position of the tracking target at the current moment; determining an estimated width and an estimated height of the tracking target in an image captured by a pan-tilt-zoom camera of the unmanned aerial vehicle according to the estimated target position; obtaining an actual width and an actual height of the tracking target in the image; determining a height difference between the estimated width and the estimated height and a width difference between the actual height and the actual width; and updating the target position of the tracking target at the next time according to the height difference and the width difference.

19 Claims, 6 Drawing Sheets

(51) Int. Cl.

| | |
|---|---|
| *G06T 7/62* | (2017.01) |
| *G06T 7/70* | (2017.01) |
| *B64U 101/30* | (2023.01) |
| *G08G 5/32* | (2025.01) |

(52) U.S. Cl.
CPC ...... *B64U 2101/30* (2023.01); *B64U 2201/00* (2023.01); *G06T 2207/10032* (2013.01); *G06T 2207/30244* (2013.01); *G08G 5/32* (2025.01)

(58) Field of Classification Search
CPC . G06T 2207/10016; G06T 7/246; G06T 7/73; B64U 20/87; B64U 2101/30; B64U 2201/00; G08G 5/32; G05D 1/12
USPC .......................................................... 382/103
See application file for complete search history.

(56) References Cited

FOREIGN PATENT DOCUMENTS

| | | | | |
|---|---|---|---|---|
| CN | 112037260 A | | 12/2020 | |
| JP | 2017503226 | * | 9/2017 | ........... G05D 1/0094 |
| KR | 20120048958 A | | 5/2012 | |

OTHER PUBLICATIONS

Runfeng Yang, et al; "UAV positioning based on extended Kalman filter algorithm" Telecommunication Engineering, vol. 56, No. 1; Jan. 2016 7 pages.
The Written Opinion of the International Searching Authority in English mailed Nov. 1, 2021; PCT/CN2021/108888.

* cited by examiner

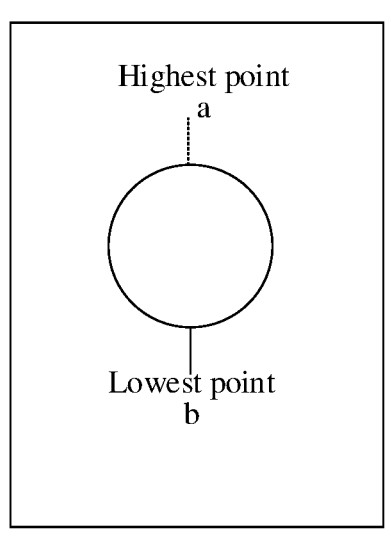
Highest point a
Lowest point b
Two-dimension
Optical center G of PTZ camera
Tangent point A
Target center O
Tangent point B
Three-dimension
FIG. 3a
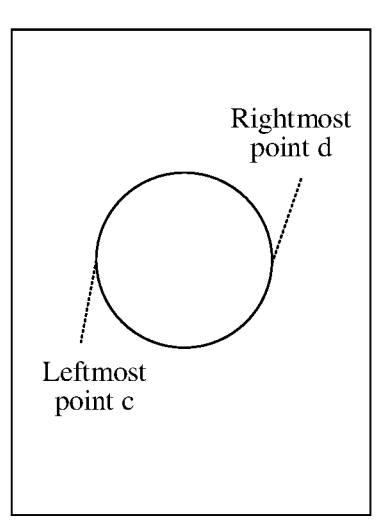
Rightmost point d
Leftmost point c
Two-dimension
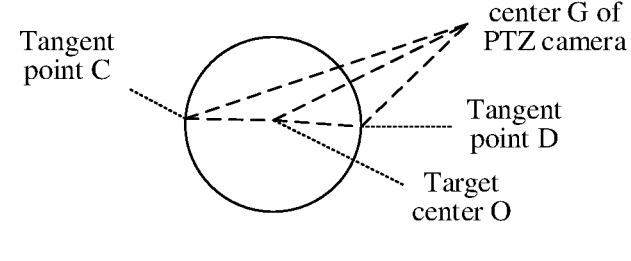
Tangent point C
Optical center G of PTZ camera
Tangent point D
Target center O
Three-dimension
FIG. 3b

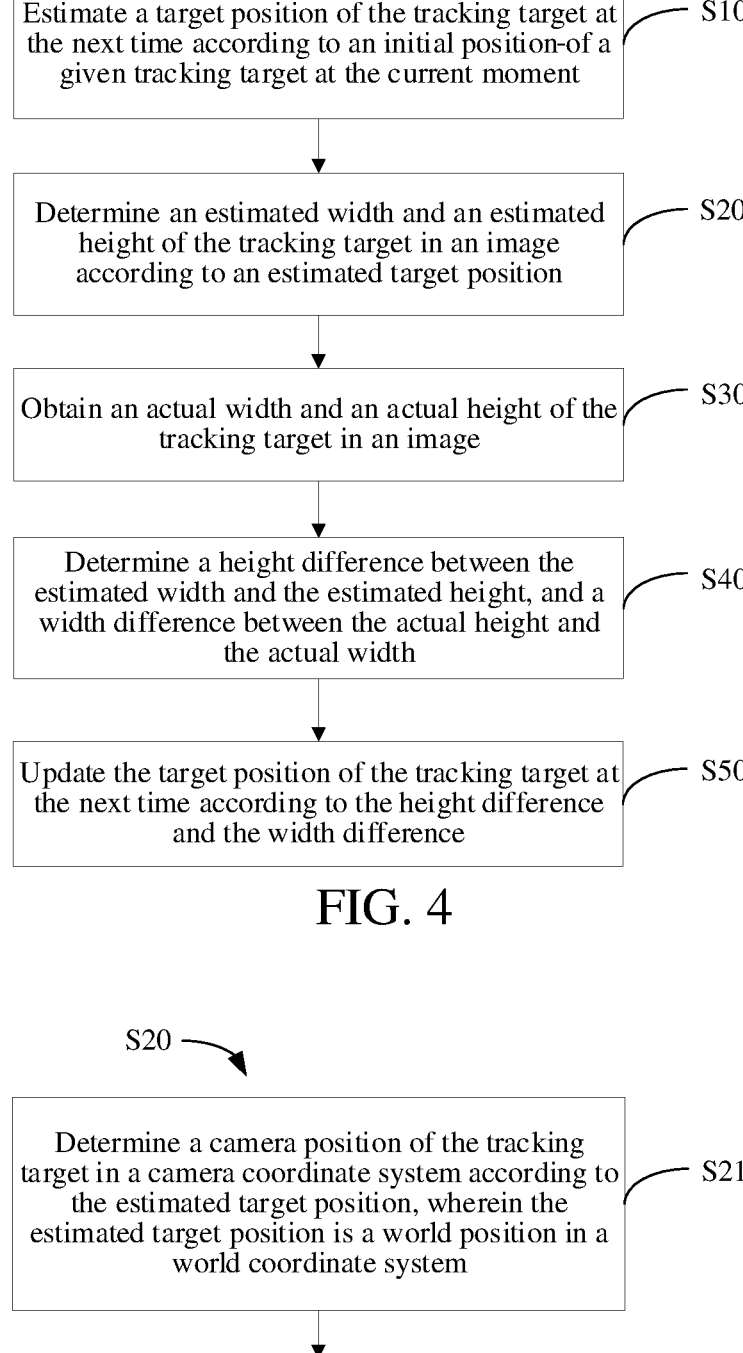

Estimate a target position of the tracking target at the next time according to an initial position of a given tracking target at the current moment — S10

Determine an estimated width and an estimated height of the tracking target in an image according to an estimated target position — S20

Obtain an actual width and an actual height of the tracking target in an image — S30

Determine a height difference between the estimated width and the estimated height, and a width difference between the actual height and the actual width — S40

Update the target position of the tracking target at the next time according to the height difference and the width difference — S50

Determine a camera position of the tracking target in a camera coordinate system according to the estimated target position, wherein the estimated target position is a world position in a world coordinate system — S21

Determine a pixel position of the tracking target in a pixel coordinate system according to the camera position of the tracking target in the camera coordinate system — S22

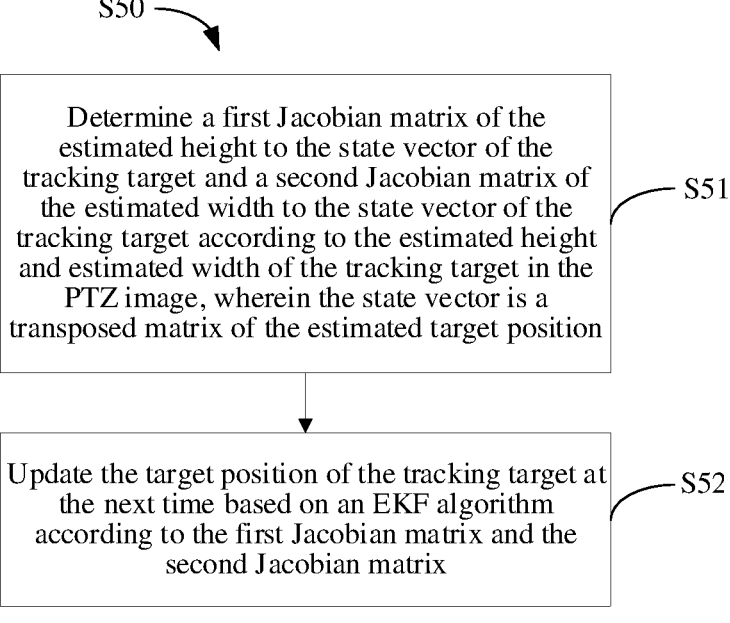

Determine a first Jacobian matrix of the estimated height to the state vector of the tracking target and a second Jacobian matrix of the estimated width to the state vector of the tracking target according to the estimated height and estimated width of the tracking target in the PTZ image, wherein the state vector is a transposed matrix of the estimated target position    S51

Update the target position of the tracking target at the next time based on an EKF algorithm according to the first Jacobian matrix and the second Jacobian matrix    S52

FIG. 6

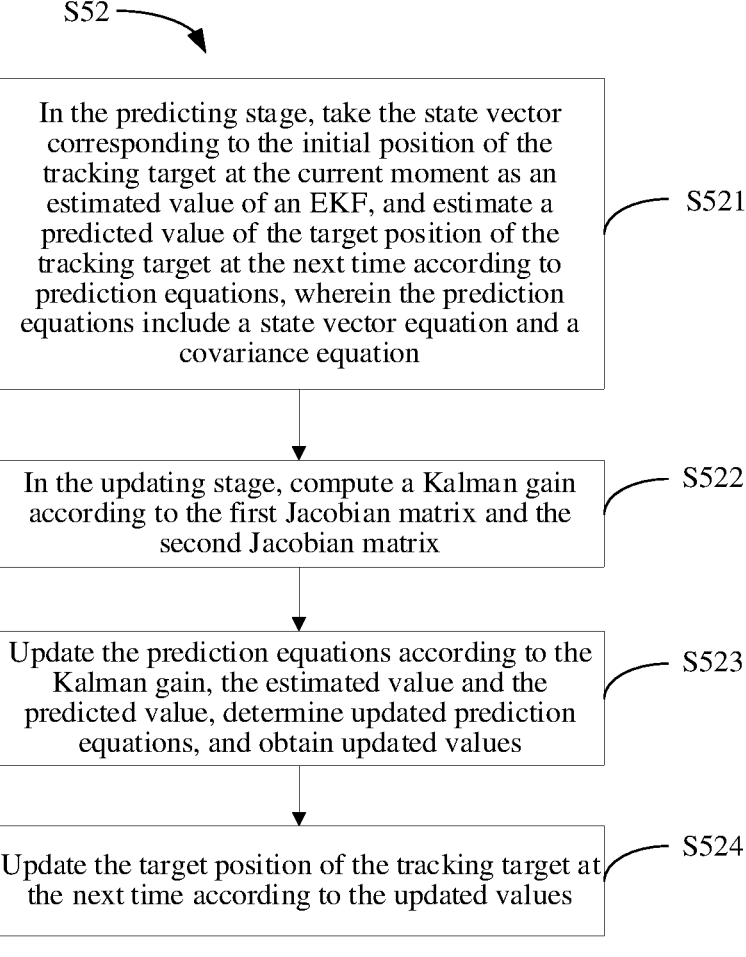

S52

In the predicting stage, take the state vector corresponding to the initial position of the tracking target at the current moment as an estimated value of an EKF, and estimate a predicted value of the target position of the tracking target at the next time according to prediction equations, wherein the prediction equations include a state vector equation and a covariance equation — S521

In the updating stage, compute a Kalman gain according to the first Jacobian matrix and the second Jacobian matrix — S522

Update the prediction equations according to the Kalman gain, the estimated value and the predicted value, determine updated prediction equations, and obtain updated values — S523

Update the target position of the tracking target at the next time according to the updated values — S524

FIG. 7

POSITION ESTIMATION METHOD AND APPARATUS FOR TRACKING TARGET, AND UNMANNED AERIAL VEHICLE

CROSS-REFERENCE TO RELATED APPLICATIONS

This application is a continuation application of PCT application No. PCT/CN2021/108888, filed on Jul. 28, 2021, which claims priority to Chinese Patent Application No. 202010896152X, filed on Aug. 31, 2020, the entire content of which is incorporated herein by reference.

TECHNICAL FIELD

Embodiments of the present application relate to the field of unmanned aerial vehicles, in particular to a position estimation method and apparatus for a tracking target, and an unmanned aerial vehicle.

BACKGROUND

In a target tracking system of an unmanned aerial vehicle, it is usually desired to achieve real-time tracking of a target and remain the size of a target box in an image basically unchanged in the tracking process, that is, maintain the "constant height and constant distance" between the unmanned aerial vehicle and the target. Therefore, it is particularly important to stably estimate the position of the target.

At present, relatively accurate target estimation methods include a back-projection method which uses a binocular camera on an unmanned aerial vehicle to back-project the obtained depth data into an image, and determine a three-dimensional position of a target according to whether a projection point falls in a target box. This method has higher accuracy, but requires that the target can appear in the field angle of the binocular camera and be within the measurement range of the binocular camera. For long-distance tracking, the target often exists outside the field of view or measurement range of the binocular camera, which directly leads to the failure of this method.

Another method roughly computes the position of a target by means of the altitude information of an aircraft and the pitch angle information of a pan-tilt-zoom (PTZ). This method relies heavily on the ground altitude information fused by an unmanned aerial vehicle, but the accuracy of the altitude information will become worse and worse as the flight time of the unmanned aerial vehicle accumulates. Moreover, when a target is farther, the pitch angle changes little and cannot accurately reflect the movement distance of the target.

However, the related technologies at least have the following problem: when a target is farther, the position estimation accuracy of the target is insufficient and thus the position of the target cannot be estimated stably.

SUMMARY

Embodiments of the present disclosure aim to provide a position estimation method and apparatus for a tracking target, and an unmanned aerial vehicle, so as to solve the problem that the position estimation accuracy of the tracking target is insufficient and thus the position of the tracking target cannot be estimated stably when a target is farther, thereby achieving the purpose of stably estimating the position of the tracking target.

According to a first aspect, an embodiment of the present disclosure provides a position estimation method for a tracking target, which is implemented in an unmanned aerial vehicle. The unmanned aerial vehicle includes a pan-tilt-zoom (PTZ) camera, and the PTZ camera is configured to obtain images. The position estimation method includes:

estimating a target position of the tracking target at the next time according to an initial position of the tracking target at the current moment;

determining an estimated width and an estimated height of the tracking target in an image captured by the PTZ camera according to an estimated target position of the tracking target;

obtaining an actual width and an actual height of the tracking target in the image;

determining a height difference between the estimated width and the estimated height and a width difference between the actual height and the actual width; and updating the target position of the tracking target at the next time according to the height difference and the width difference.

In some embodiments, the determining an estimated width and an estimated height of the tracking target in the image according to the estimated target position includes:

modeling the tracking target, determining a model corresponding to the tracking target, and determining a target box of the tracking target in the image according to the model corresponding to the tracking target.

In some embodiments, the modeling the tracking target, determining a model corresponding to the tracking target, and determining a target box of the tracking target in the image according to the model corresponding to the tracking target includes:

modeling the tracking target as a sphere, and determining a radius R of the sphere corresponding to the tracking target according to the length, width and height of the tracking target; and determining a target box corresponding to the sphere corresponding to the tracking target in the image.

In some embodiments, the determining an estimated width and an estimated height of the tracking target in the image according to the estimated target position includes:

determining camera position of the tracking target in a camera coordinate system according to the estimated target position, where the estimated target position is world position in a world coordinate system; and determining pixel position of the tracking target in a pixel coordinate system according to the camera position of the tracking target in the camera coordinate system.

In some embodiments, the determining camera position of the tracking target in a camera coordinate system according to the estimated target position includes:

assuming that the estimated target position is $P_{world}=(p_x, p_y, p_z)$, determining that a state vector corresponding to the estimated target position is $$X = P_{world}^T,$$

and the camera position of the tracking target in the camera coordinate system is $$P_{cam} = R_w^c * P_{world}^T + t,$$

where $P_{cam}=(x, y, z)^T$ represents three-dimensional coordinates of the tracking target in the camera coordinate system, $$R_w^c$$

represents a rotation matrix from the world coordinate system to the camera coordinate system, and t represents a translation vector from the world coordinate system to the camera coordinate system.

In some embodiments, the determining pixel position of the tracking target in a pixel coordinate system according to the camera position of the tracking target in the camera coordinate system includes:

assuming that the pixel position of the tracking target in the pixel coordinate system is $p=(u, v)^T$, determining that $$p = K_{intr} * P_{cam} * \frac{1}{p_z},$$

where $K_{intr}$ represents an internal parameter matrix of the PTZ camera, $P_{cam}$ represents three-dimensional coordinates of the tracking target in the camera coordinate system, and $p_z$ represents three-dimensional coordinates of the tracking target in the world coordinate system.

In some embodiments, the internal parameter matrix of the PTZ camera is $$K_{intr} = \begin{bmatrix} f_x & 0 & c_x \\ 0 & f_y & c_y \end{bmatrix},$$

where $(f_x, f_y)$ represents focal lengths of the PTZ camera, and $(c_x, c_y)$ represents principal point coordinates.

In some embodiments, the determining an estimated width and an estimated height of the tracking target in the image includes:

determining an estimated height and an estimated width of the target box in the image respectively according to the highest point and lowest point of the target box in a longitudinal axis direction and the leftmost point and rightmost point of the target box in a horizontal axis direction.

In some embodiments, the determining an estimated height of the target box in the image includes:

assuming that the highest point of the target box of the tracking target in the image in the longitudinal axis direction is a, the lowest point is b, a tangent point of the sphere corresponding to the highest point a is A, a tangent point of the sphere corresponding to the lowest point b is B, pixel coordinates of the tangent point A in the pixel coordinate system are $(u_a, v_a)$, pixel coordinates of the tangent point B in the pixel coordinate system are $(u_b, v_b)$, and a height difference between the highest point a and the lowest point b is height, determining that an estimated height of the target box in the image is $$\text{height} = K_{intr} * \begin{bmatrix} 0 \\ 2R \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target in the camera coordinate system.

In some embodiments, the determining an estimated width of the target box in the image includes:

assuming that the leftmost point of the target box of the tracking target in the image in the horizontal axis direction is c, the rightmost point is d, a tangent point of the sphere corresponding to the leftmost point c is C, a tangent point of the sphere corresponding to the rightmost point d is D, pixel coordinates of the tangent point C in the pixel coordinate system are $(u_c, v_c)$, pixel coordinates of the tangent point D in the pixel coordinate system are $(u_d, v_d)$, and a width difference between the leftmost point c and the rightmost point d is width, determining that an estimated width of the target box in the image is $$\text{width} = K_{intr} * \begin{bmatrix} 2R \\ 0 \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target in the camera coordinate system.

In some embodiments, the updating the target position of the tracking target at the next time according to the height difference and the width difference includes:

updating the target position of the tracking target at the next time based on an extended Kalman filter (EKF) algorithm according to the height difference and the width difference.

In some embodiments, the updating the target position of the tracking target at the next time based on an EKF algorithm according to the height difference and the width difference includes:

determining a first Jacobian matrix of the estimated height to the state vector of the tracking target and a second Jacobian matrix of the estimated width to the state vector of the tracking target according to the estimated height and estimated width of the tracking target in the image, where the state vector is a transposed matrix of the estimated target position; and updating the target position of the tracking target at the next time based on the EKF algorithm according to the first Jacobian matrix and the second Jacobian matrix.

In some embodiments, the first Jacobian matrix is $$J_h = K_{intr} * \begin{bmatrix} 0 & 0 & 0 \\ 0 & 0 & -\frac{2R}{z^2} \\ 0 & 0 & 0 \end{bmatrix} * R_w^c,$$

and the second Jacobian matrix is $$J_w = K_{intr} * \begin{bmatrix} 0 & 0 & -\frac{2R}{z^2} \\ 0 & 0 & 0 \\ 0 & 0 & 0 \end{bmatrix} * R_w^c,$$

where $K_{intr}$ represents an internal parameter matrix of the PTZ camera, R represents a radius of the sphere, and z represents a Z-axis coordinate of the tracking target in the camera coordinate system.

In some embodiments, the EKF algorithm includes a predicting stage and an updating stage, and the updating the target position of the tracking target at the next time based on the EKF algorithm according to the first Jacobian matrix and the second Jacobian matrix includes:

in the predicting stage, taking the state vector corresponding to the initial position of the tracking target at the current moment as an estimated value of an EKF, and estimating a predicted value of the target position of the tracking target at the next time according to prediction equations, where the prediction equations include a state vector equation and a covariance equation;

in the updating stage, computing a Kalman gain according to the first Jacobian matrix and the second Jacobian matrix;

updating the prediction equations according to the Kalman gain, the estimated value and the predicted value, determining updated prediction equations, and obtaining updated values; and updating the target position of the tracking target at the next time according to the updated values.

In some embodiments, the prediction equations are:

$$\begin{cases} x(k+1) = Fx(k) \\ P(k+1) = FP(k)F^T + Q \end{cases},$$

where x(k+1) represents a predicted value of the state vector corresponding to the position of the tracking target at the next time, x(k) represents an estimated value of the state vector corresponding to the position of the tracking target at the current moment, F represents a system state transition matrix, P(k+1) represents a covariance predicted value, P(k) represents a covariance estimated value, $F^T$ represents a transposed matrix of the system state transition matrix, and Q represents a noise matrix.

In some embodiments, the computing a Kalman gain according to the first Jacobian matrix and the second Jacobian matrix includes:

computing a Kalman gain $K=P(k+1)J^T(HP(k+1)H^T+R)^{-1}$, where P(k+1) represents a covariance predicted value, $J^T$ represents a transposed matrix of the first Jacobian matrix or the second Jacobian matrix, H represents a transition matrix from state to observation, P(k+1) represents a covariance predicted value, $H^T$ represents a transposed matrix of the transition matrix from state to observation, and R represents a measurement noise variance.

In some embodiments, the updating the prediction equations according to the Kalman gain, the measured value and the predicted value, and determining updated prediction equations includes:

determining updated prediction equations:

$$\begin{cases} x(k+1) = x(k+1) + K(z_{measurement} - z_{prediction}) \\ P(k+1) = (I - KH)P(k+1) \end{cases},$$

where x(k+1) represents a predicted value of the state vector corresponding to the target position of the tracking target at the next time, K represents a Kalman gain, $z_{measurement}$ represents a measured value of the height or the width of the target box, $z_{prediction}$ represents a predicted value of the height of the target box represented by the first Jacobian matrix $J_h$ or a predicted value of the width of the target box represented by the second Jacobian matrix $J_w$, P(k+1) represents a covariance predicted value, and H represents a transition matrix from state to observation.

In some embodiments, the updating the target position of the tracking target at the next time according to the updated prediction equations includes:

substituting the updated values obtained in the updating stage into the prediction equations in the predicting stage to update the target position of the tracking target at the next time; and taking the updated position as the estimated target position to iteratively update the target position of the tracking target at the next time.

According to a second aspect, an embodiment of the present disclosure provides an unmanned aerial vehicle. The unmanned aerial vehicle includes a fuselage, arms connected to the fuselage, power systems arranged on the arms, and a tracking system arranged on the fuselage, where the tracking system includes a controller, and the controller includes:

at least one processor; and a memory communicatively connected to the at least one processor, wherein the memory stores instructions executable by the at least one processor, and the instructions, when executed by the at least one processor, cause the at least one processor to perform the foregoing position estimation method for a tracking target.

According to a third aspect, a non-transitory computer-readable storage medium is provided. The computer-readable storage medium stores computer executable instructions, and the computer executable instructions, when executed by an unmanned aerial vehicle, cause the unmanned aerial vehicle to perform the foregoing position estimation method for a tracking target.

The embodiments of the present disclosure have the following beneficial effects: Provided is a position estimation method for a tracking target, used for an unmanned aerial vehicle, the unmanned aerial vehicle includes a PTZ camera, and the PTZ camera is configured to obtain an image. The method includes: estimating the target position of the tracking target at the next time according to the initial position of the tracking target at the current moment; determining an estimated width and an estimated height of the tracking target in the image according to the estimated target position; obtaining an actual width and an actual height of the tracking target in the image; determining height difference between the estimated width and the estimated height, and determining a width difference between the actual height and the actual width; and updating the target position of the tracking target at the next time according to the height difference and the width difference. By computing the height difference and the width difference of the tracking target in the image, the target position of the tracking target at the next time is updated, so that the embodiments of the present disclosure can achieve the purpose of stably estimating the position of the tracking target.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

FIG. 3*a* is a schematic diagram of a corresponding relationship between a model and an image provided in an embodiment of the present disclosure.

FIG. 3*b* is a schematic diagram of a corresponding relationship between another model and an image provided in an embodiment of the present disclosure.

FIG. 4 is a schematic flowchart of a position estimation method for a tracking target provided in an embodiment of the present disclosure.

FIG. 5 is a detailed flowchart of step S20 in FIG. 4.

FIG. 6 is a detailed flowchart of step S50 in FIG. 4.

FIG. 7 is a detailed flowchart of step S52 in FIG. 6.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are merely some embodiments of the present disclosure rather than all of the embodiments. All other embodiments obtained by a person of ordinary skill in the art based on the embodiments of this application without creative efforts shall fall within the protection scope of this application.

Figure 1:
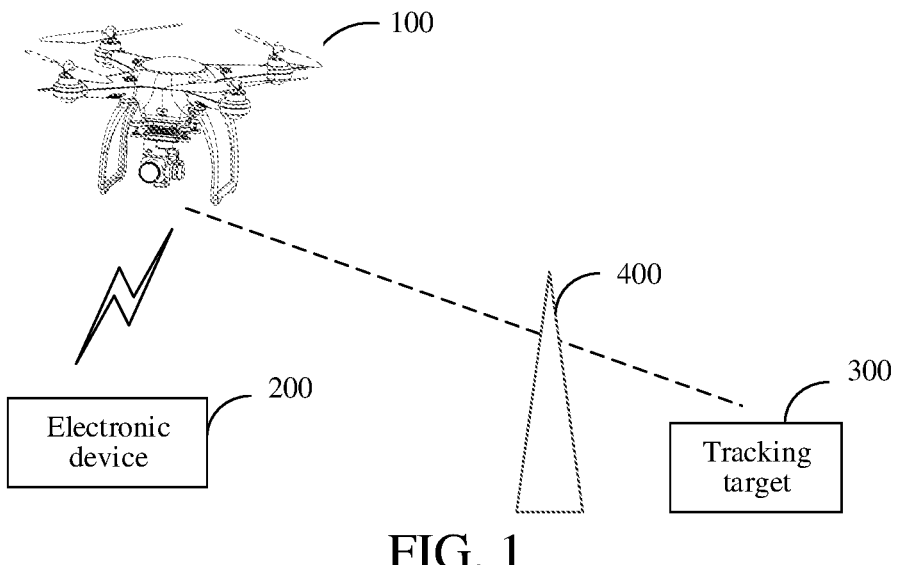
FIG. 1 is a schematic diagram of an application scenario provided in an embodiment of the present disclosure.

A position estimation method for a tracking target provided in an embodiment of the present disclosure can be used for an application scenario shown in FIG. 1. The application scenario shown in FIG. 1 includes an unmanned aerial vehicle 100 and a tracking target 300. The unmanned aerial vehicle 100 can be used for tracking the tracking target 300. In the process of tracking the tracking target 300, the unmanned aerial vehicle 100 may encounter an obstacle 400. The unmanned aerial vehicle 100 needs to avoid the obstacle 400 while tracking the tracking target 300 to achieve normal flight.

The unmanned aerial vehicle 100 may be appropriate unmanned aerial vehicles, including fixed-wing unmanned aerial vehicles and rotary-wing unmanned aerial vehicles, such as helicopters, four-rotor aircrafts and aircrafts with other numbers of rotors and/or rotor configurations. The unmanned aerial vehicle 100 may also be other movable objects, such as manned aircrafts, aircraft models, unmanned airships, unmanned hot air balloons, and robots. The tracking target 300 may be any appropriate movable or immovable objects, including vehicles, people, animals, buildings, mountains, rivers, and the like. The obstacle 400 may be buildings, mountains, trees, forests, signal towers or other movable or immovable objects (only one obstacle 400 is shown in FIG. 1, and there may be more obstacles or no obstacles in practical applications).

Figure 2:
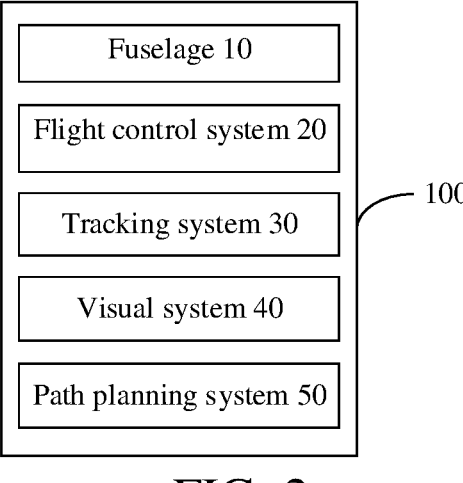
FIG. 2 is a schematic structural diagram of an unmanned aerial vehicle provided in an embodiment of the present disclosure.

In some embodiments, referring to FIG. 2, FIG. 2 is a schematic structural diagram of an unmanned aerial vehicle provided in an embodiment of the present disclosure.

As shown in FIG. 2, the unmanned aerial vehicle 100 includes a fuselage 10, arms (not shown in the figure) connected to the fuselage 10, power systems (not shown in the figure) arranged on the arms, and a control system arranged on the fuselage 10. The power systems are configured to provide a thrust force, a lift force, and the like for the flight of the unmanned aerial vehicle 100. The control system is a central nerve of the unmanned aerial vehicle 100, and may include multiple functional units, such as a flight control system 20, a tracking system 30, a path planning system 50, a visual system 40 and other systems with specific functions.

The tracking system 30 and the visual system 40 both include an imaging apparatus and a control chip, where the imaging apparatus is a PTZ camera. The tracking system 30 is configured to obtain a state of the tracking target 300, a tracking distance (that is, the distance between the unmanned aerial vehicle 100 and the tracking target 300), and the like. The visual system 40 is configured to provide environmental maps or original point clouds of the surrounding environment of the unmanned aerial vehicle 100.

The flight control system 20 includes various sensors (such as gyroscopes and accelerometers). The flight control system 20 is configured to obtain a real-time position of the unmanned aerial vehicle 100 and control a flight attitude of the unmanned aerial vehicle 100. The path planning system 50 is configured to plan a path, and instruct the flight control system 20 to control the flight attitude of the unmanned aerial vehicle 100 to make the unmanned aerial vehicle 100 fly according to the specified path.

In practical applications, the flight control system 20 and the path planning system 50 may be arranged inside the fuselage 10, and the tracking system 30 and the visual system 40 may be arranged outside the fuselage 10 and fixed on the fuselage 10. The imaging apparatuses of the tracking system 30 and the visual system 40 may form a monocular or binocular visual system, where the imaging apparatus may be a high-definition digital camera or other imaging apparatuses, and the imaging apparatus may be arranged at any appropriate position favorable for shooting. In some embodiments, the imaging apparatus of the tracking system 30 is mounted at the bottom of the fuselage 10 by the PTZ, and the imaging apparatus of the visual system 40 is arranged at the front part and/or the lower part of the fuselage 10. Each system may be arranged separately. In some embodiments, some or all of the foregoing systems may also be integrated in one or more apparatuses.

In some embodiments, the unmanned aerial vehicle 100 tracks the tracking target 300 according to target characteristics, where in some embodiments, target characteristics are stored in the unmanned aerial vehicle 100 in advance, and in some embodiments, target characteristics are obtained by other means. Some application scenarios of the unmanned aerial vehicle 100 also include an electronic device 200, and target characteristics may be sent to the unmanned aerial vehicle 100 by the electronic device 200.

Specifically, the electronic device 200 may display a picture taken by the unmanned aerial vehicle 100, a user selects a target in the picture by a box, and after the target picture selected by the user is uploaded to the unmanned aerial vehicle 100, the unmanned aerial vehicle 100 may extract target characteristics according to the selected target picture. The communication connection between the unmanned aerial vehicle 100 and the electronic device 200 may be established by wireless communication modules (such as a signal receiver and a signal transmitter) respectively arranged in the unmanned aerial vehicle 100 and the electronic device 200, so as to upload or send data/instructions. The electronic device 200 may be a smart phone, a tablet computer, a computer, a remote controller, or the like.

In the process of tracking the tracking target 300 and avoiding the obstacle 400 during flight, the unmanned aerial vehicle 100 needs to plan an appropriate path according to the position of the tracking target 300, and fly according to the planned path to avoid the obstacle 400 while tracking. Therefore, the estimation of a target position is very important. In the embodiments of the present disclosure, multiple methods are used for obtaining a correlation value of the target position, the correlation value of the target position is taken as a measured value of an EKF, and the EKF is used for recursive estimation to obtain an estimated value of the target position.

In the embodiments of the present disclosure, a model corresponding to the tracking target 300 is determined by modeling the tracking target 300. In the embodiments of the present disclosure, the tracking target 300 which is modeled as a sphere is taken as an example for description.

Referring to FIG. 3a and FIG. 3b together, FIG. 3a is a schematic diagram of a corresponding relationship between a model and an image provided in an embodiment of the present disclosure, and FIG. 3b is a schematic diagram of a corresponding relationship between another model and an image provided in an embodiment of the present disclosure.

Specifically, the radius R of a sphere corresponding to tracking target model is determined according to the length, width and height of the tracking target 300. Specifically, according to the length a, width b and height c of the tracking target 300, the radius of the sphere is determined as:

$$R = \frac{a+b+c}{3 \times 2},$$

where a represents a length of the tracking target, b represents a width of the tracking target 300, c represents a height of the tracking target 300, and R represents a radius of the sphere corresponding to the tracking target 300.

It can be understood that the length, width and height of the tracking target 300 need not be very accurate, but can roughly express the shape and size of an object. For example, if the tracking target 300 is an ordinary car, general sizes 4.7*1.5*1.8 may be used.

After a model corresponding to the tracking target 300 is determined, a projection relationship between the model and an image needs to be established, where the image is a PTZ image obtained by a PTZ camera, and the tracking target 300 is modeled as a sphere. As shown in FIG. 3a, assuming that the highest point of the tracking target 300 in a longitudinal axis direction of the image is a, the lowest point is b, a tangent point of the sphere corresponding to the highest point a is A, and a tangent point of the sphere corresponding to the lowest point b is B, during long-distance tracking, it is approximately considered that a connection line OA between the tangent point A and a target center O of the tracking target 300 is perpendicular to a connection line OG between an optical center G of the PTZ camera and the target center O, and a connection line OB between the tangent point B and the target center O of the tracking target 300 is also perpendicular to the connection line OG between the optical center G of the PTZ camera and the target center O; and furthermore, it is approximately considered that a connection line between the tangent point A and the tangent point B passes through the target center O.

Moreover, as shown in FIG. 3b, assuming that the leftmost point of the tracking target 300 in a horizontal axis direction of the image is c, the rightmost point is d, a tangent point of the sphere corresponding to the leftmost point c is C, and a tangent point of the sphere corresponding to the rightmost point d is D, during long-distance tracking, it is approximately considered that a connection line OC between the tangent point C and the target center O of the tracking target 300 is perpendicular to the connection line OG between the optical center G of the PTZ camera and the target center O, and a connection line OD between the tangent point D and the target center O of the tracking target 300 is perpendicular to the connection line OG between the optical center G of the PTZ camera and the target center O; and furthermore, it is approximately considered that a connection line between the tangent point C and the tangent point D passes through the target center O.

By modeling the tracking target 300 as a sphere, in the embodiments of the present disclosure, the position of the tracking target 300 may be estimated based on the modeled sphere.

Referring to FIG. 4, FIG. 4 is a schematic flowchart of a position estimation method for a tracking target 300 provided in an embodiment of the present disclosure. The is implemented in an unmanned aerial vehicle 100, the unmanned aerial vehicle 100 includes a PTZ camera, and the PTZ camera is configured to obtain images in front of the unmanned aerial vehicle 100 during the unmanned aerial vehicle 100 flying.

As shown in FIG. 4, the position estimation method includes: Step S10: The target position of the tracking target 300 at the next time is estimated according to an initial position of the tracking target 300 at the current moment.

It can be understood that the current target position of the tracking target 300 is unknown, and in order to estimate the current target position of the tracking target 300, the initial position needs to be given as the input of the EKF algorithm to converge to an actual position of the tracking target 300, where the initial position of the tracking target 300 at the current moment is given by a processor of the unmanned aerial vehicle 100. The initial position is estimated by the unmanned aerial vehicle 100 according to the actual situation of the tracking target 300. By estimating the initial position of the tracking target, the estimated position is taken as the initial position of the tracking target 300 at the current position, which may increase the convergence speed compared with random giving. After the initial position of the tracking target 300 at the current moment is given, the initial position is taken as the current world position of the tracking target 300, then, the next position is estimated according to the current position, and the next position becomes the current position again, forming an iteration process. The iteration process is stopped until an error is less than a preset threshold by convergence.

Specifically, the initial position is taken as the input of the EKF algorithm, and the target position of the tracking target 300 at the next time is estimated by the EKF algorithm, so as to obtain an estimated target position of the tracking target 300, where the estimated target position is world coordinate information. The EKF algorithm includes a predicting stage and an updating stage. The core idea of the EKF algorithm is prediction and measurement feedback, and the EKF algorithm consists of two parts, where the first part is a state prediction equation, and the second part is an observation equation. In the predicting stage, the predicted value computed by a system state equation is used as prior information, and then, the is updated again in the observation part.

In the predicting stage, prediction equations include a state vector equation and a covariance equation which are respectively:

$$\begin{cases} x(k+1) = Fx(k) \\ P(k+1) = FP(k)F^T + Q \end{cases},$$

where x(k+1) represents a predicted value of the state vector corresponding to the position of the tracking target 300 at the next time, x(k) represents a measured value of the state vector corresponding to the position of the tracking target 300 at the current moment, F represents a system state transition matrix, P(k+1) represents a covariance predicted value, P(k) represents a covariance measured value, $F^T$ represents a transposed matrix of the system state transition matrix, and Q represents a noise matrix.

In the embodiments of the present disclosure, the system state transition matrix F may be $$F = \begin{bmatrix} 1, 0, 0, dt, 0, 0 \\ 0, 1, 0, 0, dt, 0 \\ 0, 0, 1, 0, 0, dt \\ 0, 0, 0, 1, 0, 0, \\ 0, 0, 0, 0, 1, 0 \\ 0, 0, 0, 0, 0, 1 \end{bmatrix}.$$

Step S20: An estimated width and an estimated height of the tracking target 300 in the image are determined according to the estimated target position.

Specifically, the image is a PTZ image obtained by a PTZ camera, and an estimated width and an estimated height of the tracking target 300 in the image are determined according to the estimated target position, including: the tracking target 300 is modeled, a model corresponding to the tracking target 300 is determined, and a target box of the tracking target in the image is determined according to the model corresponding to the tracking target 300.

Specifically, the tracking target 300 is modeled, a model corresponding to the tracking target 300 is determined, and a target box of the tracking target 300 in the image is determined according to the model corresponding to the tracking target 300, including:

the tracking target 300 is modeled as a sphere, and a radius R of the sphere corresponding to the tracking target 300 is determined according to the length, width and height of the tracking target 300; and a target box corresponding to the sphere corresponding to the tracking target 300 in the image is determined.

Specifically, the tracking target 300 is modeled as a sphere, an average value of the length, width and height of the tracking target 300 is computed, and the radius R of the sphere is determined as the average value of the length, width and height, that is, $$R = \frac{a+b+c}{3 \times 2},$$

here A represents a length of the tracking target 300, b represents a width of the tracking target 300, c represents a height of the tracking target, and R represents a radius of the sphere corresponding to the tracking target 300.

Specifically, a target box corresponding to the sphere corresponding to the tracking target 300 in the image is determined, including: the sphere corresponding to the tracking target 300 is projected into the image, and a target box corresponding to the sphere is determined.

Specifically, the sphere corresponding to the tracking target 300 is projected into the image, and the sphere corresponding to the tracking target 300 is projected from a three-dimensional form to a two-dimensional form in the image. After the sphere corresponding to the tracking target 300 is projected into the image, a target box is formed in the image. In the embodiments of the present disclosure, the target box is a circular box. It can be understood that since the target box corresponding to the sphere is a circular box, the position of the target box in the image may be determined according to the position of the center of a circle and radius of the circular box. Specifically, a target box corresponding to the sphere is determined, including: the position of the center of a circle and radius of the target box are determined, and the position of the target box corresponding to the sphere in the image is determined according to the position of the center of a circle and radius of the target box.

As shown in FIG. 3a, assuming that the highest point of the tracking target 300 in a longitudinal axis direction of the image is a, the lowest point is b, a tangent point of the sphere corresponding to the highest point a is A, and a tangent point of the sphere corresponding to the lowest point b is B, during long-distance tracking, it is approximately considered that a connection line OA between the tangent point A and a target center O of the tracking target 300 is perpendicular to a connection line OG between an optical center G of the PTZ camera and the target center O, and a connection line OB between the tangent point B and the target center O of the tracking target 300 is also perpendicular to the connection line OG between the optical center G of the PTZ camera and the target center O; and furthermore, it is approximately considered that a connection line between the tangent point A and the tangent point B passes through the target center O.

Moreover, as shown in FIG. 3b, assuming that the leftmost point of the tracking target 300 in a horizontal axis direction of the image is c, the rightmost point is d, a tangent point of the sphere corresponding to the leftmost point c is C, and a tangent point of the sphere corresponding to the rightmost point d is D, during long-distance tracking, it is approximately considered that a connection line OC between the tangent point C and the target center O of the tracking target 300 is perpendicular to the connection line OG between the optical center G of the PTZ camera and the target center O, and a connection line OD between the tangent point D and the target center O of the tracking target 300 is perpendicular to the connection line OG between the optical center G of the PTZ camera and the target center O; and furthermore, it is approximately considered that a connection line between the tangent point C and the tangent point D passes through the target center O.

Specifically, referring to FIG. 5, FIG. 5 is a detailed flowchart of step S20 in FIG. 4.

As shown in FIG. 5, step S20: an estimated width and an estimated height of the tracking target 300 in the image are determined according to the estimated target position, including:

Step S21: Camera position of the tracking target 300 in a camera coordinate system is determined according to the estimated target position, where the estimated target position is world position in a world coordinate system.

The estimated target position is world position in a world coordinate system. Specifically, assuming that the world position of the tracking target 300 at the next time is $P_{world}=(p_x, p_y, p_z)$, that is, the estimated target position is $P_{world}=(p_x, p_y, p_z)$, it is determined that the state vector corresponding to the target position of the tracking target 300 is $$X = P_{world}^T,$$

and the camera position of the tracking target 300 in the camera coordinate system is $$P_{cam} = R_w^c * P_{world}^T + t,$$

that is, the estimated camera position is $$P_{cam} = R_w^c * P_{world}^T + t.$$

It can be understood that the estimated camera position is the camera position corresponding to the target center O, where $P_{cam}=(x, y, z)^T$ represents three-dimensional coordinates of the tracking target 300 in the camera coordinate system, $P_{cam}=(x, y, z)^T$ represents three-dimensional coordinates of the target center O of the tracking target 300 in the camera coordinate system, $$R_w^c$$

represents a rotation matrix from the world coordinate system to the camera coordinate system, and t represents a translation vector from the world coordinate system to the camera coordinate system.

The coordinates of the tangent point A and the tangent point B in the camera coordinate system are respectively expressed as:

$$\begin{cases} P_{cam,A} = P_{cam} + R_1 \\ P_{cam,B} = P_{cam} - R_1 \end{cases}$$

where $P_{cam}$ represents coordinates of the target center in the camera coordinate system, $P_{cam,A}$ represents coordinates of the tangent point A in the camera coordinate system, $P_{cam,B}$ represents coordinates of the tangent point B in the camera coordinate system, $P_{cam}$ represents coordinates of the target center O in the camera coordinate system, $R_1=(0, R, 0)^T$, and R represents a radius of the sphere. The tangent point A corresponds to the highest point a, and pixel coordinates of the tangent point A in the image are $(u_a, v_a)$. The tangent point B corresponds to the lowest point b, and pixel coordinates of the tangent point B in the image are $(u_b, v_b)$.

The coordinates of the tangent point C and the tangent point D in the camera coordinate system are respectively expressed as:

$$\begin{cases} P_{cam,C} = P_{cam} + R_2 \\ P_{cam,D} = P_{cam} - R_2 \end{cases}$$

where $P_{cam,C}$ represents coordinates of the tangent point C in the camera coordinate system, $P_{cam,D}$ represents coordinates of the tangent point D in the camera coordinate system, $P_{cam}$ represents coordinates of the target center O in the camera coordinate system, $R_2=[R, 0, 0]$, and R represents a radius of the sphere. The tangent point C corresponds to the leftmost point c, and pixel coordinates of the tangent point C in the image are $(u_c, v_c)$. The tangent point D corresponds to the rightmost point d, and pixel coordinates of the tangent point D in the image are $(u_d, v_d)$.

Step S22: Pixel position information of the tracking target 300 in a pixel coordinate system is determined according to the camera position of the tracking target 300 in the camera coordinate system.

Specifically, assuming that the pixel position of the tracking target 300 in the pixel coordinate system is $p=(u, v)^T$, it is determined that $$p = K_{intr} * P_{cam} * \frac{1}{p_z},$$

where $K_{intr}$ represents an internal parameter matrix of the PTZ camera, $P_{cam}$ represents three-dimensional coordinates of the tracking target 300 in the camera coordinate system, and $p_z$ represents three-dimensional coordinates of the tracking target 300 in the world coordinate system. It can be understood that $P_{cam}$ represents three-dimensional coordinates of the target center O of the tracking target 300 in the camera coordinate system, and $p_z$ represents three-dimensional coordinates of the estimated target position in the world coordinate system.

Specifically, a conversion relationship between the camera coordinate system and the pixel coordinate system is:

$$\begin{cases} u = \dfrac{f_x \cdot x}{z} + c_x \\ v = \dfrac{f_y \cdot y}{z} + c_y \end{cases}$$

where $(f_x, f_y)$ represents focal lengths, and $(c_x, c_y)$ represents principal point coordinates. The focal lengths and the principal point coordinates may be obtained by calibration of the PTZ camera. The conversion relationship is transformed into a matrix form:

$$p = K_{intr} * P_{cam} * \frac{1}{p_z}$$

where $K_{intr}$ represents an internal parameter matrix of the PTZ camera, $P_{cam}$ represents three-dimensional coordinates of the tracking target 300 in the camera coordinate system, and $p_z$ represents three-dimensional coordinates of the tracking target 300 in the world coordinate system. In the embodiments of the present disclosure, the internal parameter matrix of the PTZ camera is $$K_{intr} = \begin{bmatrix} f_x & 0 & c_x \\ 0 & f_y & c_y \end{bmatrix},$$

where ($f_x$, $f_y$) represents focal lengths of the PTZ camera, and ($c_x$, $c_y$) represents principal point coordinates.

In the embodiments of the present disclosure, by converting the world position information of the tracking target 300 at the current moment into the pixel position information of the tracking target 300 in the image, it is helpful to determine the position change of the tracking target 300 in the image, so as to facilitate the position estimation of the tracking target 300.

Specifically, an estimated width and an estimated height of the tracking target 300 in the image are determined, including:

an estimated height and an estimated width of the target box in the image are determined respectively according to the highest point and lowest point of the target box in a longitudinal axis direction and the leftmost point and rightmost point of the target box in a horizontal axis direction.

Specifically, an estimated height of the target box in the image is determined, including:

Assuming that the highest point of the target box of the tracking target 300 in the image in the longitudinal axis direction is a, the lowest point is b, a tangent point of the sphere corresponding to the highest point a is A, a tangent point of the sphere corresponding to the lowest point b is B, pixel coordinates of the tangent point A in the pixel coordinate system are ($u_a$, $v_a$), pixel coordinates of the tangent point B in the pixel coordinate system are ($u_b$, $v_b$), and a height difference between the highest point a and the lowest point b is height, it is determined that an estimated height of the target box in the image is $$height = K_{intr} * \begin{bmatrix} 0 \\ 2R \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target 300 in the camera coordinate system.

Specifically, according to the coordinates of the tangent points A, B, C and D in the camera coordinate system, the highest point and lowest point of the target box in the longitudinal axis direction of the image and the leftmost point and rightmost point of the target box in the horizontal axis direction of the image are determined. Referring to FIG. 3a and FIG. 3b, the tangent point A corresponds to the highest point a, and pixel coordinates of the tangent point A in the image are ($u_a$, $v_a$); the tangent point B corresponds to the lowest point b, and pixel coordinates of the tangent point B in the image are ($u_b$, $v_b$); the tangent point C corresponds to the leftmost point c, and pixel coordinates of the tangent point C in the image are ($u_c$, $v_c$); and the tangent point D corresponds to the rightmost point d, and pixel coordinates of the tangent point D in the image are ($u_d$, $v_d$).

Determination of an estimated height of the target box in the image is equivalent to determination of the distance between the highest point a corresponding to the tangent point A and the lowest point b corresponding to the tangent point B in the image. Specifically, the distance between the tangent point A and the tangent point B in the image, that is, the estimated height, may be expressed as:

$$height = K_{intr} * \left( P_{cam,B} * \frac{1}{p_{z,B}} - P_{cam,A} * \frac{1}{p_{z,A}} \right)[0]$$

where $K_{intr}$ represents an internal parameter matrix of the PTZ camera, $P_{cam,B}$ represents three-dimensional coordinates of the tangent point B in the camera coordinate system, $p_{z,B}$ represents three-dimensional coordinates of the tangent point B in the world coordinate system, $P_{cam,A}$ represents three-dimensional coordinates of the tangent point A in the camera coordinate system, and $p_{z,A}$ represents three-dimensional coordinates of the tangent point A in the world coordinate system. In the embodiments of the present disclosure, the internal parameter matrix $K_{intr}$ of the PTZ camera is obtained by prior calibration, for example, by a camera calibration technology.

Since only the y-axis coordinates of the tangent point A and the tangent point B are inconsistent, the foregoing formula $$height = K_{intr} * \left( P_{cam,B} * \frac{1}{p_{z,B}} - P_{cam,A} * \frac{1}{p_{z,A}} \right)[0]$$

may be simplified as:

$$height = K_{intr} * (P_{cam,B} - P_{cam,A}) * \frac{1}{z} = K_{intr} * \begin{bmatrix} 0 \\ 2R \\ 0 \end{bmatrix} * \frac{1}{z}$$

which is equivalent to $$height = K_{intr} * \begin{bmatrix} 0 \\ 2R \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target 300 in the camera coordinate system.

Specifically, an estimated width of the target box in the image is determined, including:

assuming that the leftmost point of the target box of the tracking target 300 in the image in the horizontal axis direction is c, the rightmost point is d, a tangent point of the sphere corresponding to the leftmost point c is C, a tangent point of the sphere corresponding to the rightmost point d is D, pixel coordinates of the tangent point C in the pixel coordinate system are ($u_c$, $v_c$), pixel coordinates of the tangent point D in the pixel coordinate system are ($u_d$, $v_d$), and a width difference between the leftmost point c and the rightmost point d is width, it is determined that an estimated width of the target box in the image is $$width = K_{intr} * \begin{bmatrix} 2R \\ 0 \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target 300 in the camera coordinate system.

Specifically, determination of an estimated width of the target box in the image is equivalent to determination of the distance between the leftmost point c corresponding to the tangent point C and the rightmost point d corresponding to the tangent point D in the image. In a similar way, the distance between the tangent point C and the tangent point D in the image, that is, the estimated width, may be expressed as:

$$width = K_{intr} * (P_{cam,D} - P_{cam,C}) * \frac{1}{z}$$

where $K_{intr}$ represents an internal parameter matrix of the PTZ camera, $P_{cam,D}$ represents three-dimensional coordinates of the tangent point D in the camera coordinate system, $P_{cam,C}$ represents three-dimensional coordinates of the tangent point C in the camera coordinate system, and z represents a Z-axis coordinate of the tracking target 300 in the camera coordinate system. The foregoing formula $$width = K_{intr} * (P_{cam,D} - P_{cam,C}) * \frac{1}{z}$$

may be simplified as:

$$width = K_{intr} * (P_{cam,D} - P_{cam,C}) * \frac{1}{z} = K_{intr} * \begin{bmatrix} 2R \\ 0 \\ 0 \end{bmatrix} * \frac{1}{z}$$

By determining the height difference and width difference of the tracking target 300 in the image according to the pixel position information of the tracking target 300 in the image, it is helpful to determine the position of the tracking target in the image, so as to provide advantages for estimating the position of the image at the next time.

Step S30: An actual width and an actual height of the tracking target 300 in the image are obtained.

Specifically, an actual width and an actual height of the tracking target 300 in the image are obtained by an external module. For example, a target box of the tracking target 300 in the image is obtained by a tracking module, and an actual width and an actual height of the target box are measured.

Step S40: A height difference between the estimated width and the estimated height, and a width difference between the actual height and actual width are determined.

Specifically, the height difference is an absolute value of a difference between the estimated height and the actual height, that is, the height difference=|estimated height−actual height|, and the width difference is a difference between the estimated width and the actual width, that is, the width difference=|estimated width−actual width|.

Step S50: The target position of the tracking target 300 at the next time is updated based on an EKF algorithm according to the height difference and the width difference.

The EKF is an algorithm that uses a linear system state equation to optimally estimate a system state by system input and output observation data.

Referring to FIG. 6, FIG. 6 is a detailed flowchart of step S50 in FIG. 4.

As shown in FIG. 6, step S50: the target position of the tracking target 300 at the next time is updated according to the height difference and the width difference, including: the target position of the tracking target at the next time is updated based on an EKF algorithm according to the height difference and the width difference, specifically, including the following steps:

Step S51: A first Jacobian matrix of the estimated height to the state vector of the tracking target 300 and a second Jacobian matrix of the estimated width to the state vector of the tracking target 300 are determined according to the estimated height and estimated width of the tracking target 300 in the image, where the state vector is a transposed matrix of the estimated target position.

Specifically, the estimated height of the tracking target 300 in the image is $$height = K_{intr} * \begin{bmatrix} 0 \\ 2R \\ 0 \end{bmatrix} * \frac{1}{z},$$

and the state vector of the tracking target 300 is a transposed matrix of the world position information of the tracking target 300, that is, the state vector corresponding to the estimated target position of the tracking target $$300 \text{ is } X = P_{world}^T,$$

so it is determined that the first Jacobian matrix of the estimated height to the state vector of the tracking target 300 is:

$$J_h = \frac{\partial(height)}{\partial X} = \frac{\partial(height)}{\partial(T_w^c * X)} * \frac{\partial(T_w^c * X)}{\partial X}$$

which may be simplified as:

$$J_h = \frac{\partial(height)}{\partial P_{cam}} * \frac{\partial(R_w^c * X + t)}{\partial X} = K_{intr} * \begin{bmatrix} 0 & 0 & 0 \\ 0 & 0 & -\frac{2R}{z^2} \\ 0 & 0 & 0 \end{bmatrix} * R_w^c$$

where $K_{intr}$ represents an internal parameter matrix of the PTZ camera, R represents a radius of the sphere, z represents a Z-axis coordinate of the tracking target 300 in the camera coordinate system, and $R_w^c$ represents a rotation matrix from the world coordinate system to the camera coordinate system.

Specifically, the width of the tracking target 300 in the image is $$width = K_{intr} * \begin{bmatrix} 2R \\ 0 \\ 0 \end{bmatrix} * \frac{1}{z},$$

and the state vector of the tracking target 300 is a transposed matrix of the world position information of the tracking target, that is, the state vector corresponding to the estimated target position of the tracking target $$300 \text{ is } X = P_{world}^{T},$$

so it is determined that the second Jacobian matrix of the estimated width to the state vector of the tracking target is:

$$J_w = \frac{\partial(\text{width})}{\partial X} = \frac{\partial(\text{width})}{\partial(T_w^c * X)} * \frac{\partial(T_w^c * X)}{\partial X}$$

which may be simplified as:

$$J_w = \frac{\partial(\text{width})}{\partial P_{cam}} * \frac{\partial(R_w^c * X + t)}{\partial X} = K_{intr} * \begin{bmatrix} 0 & 0 & -\frac{2R}{z^2} \\ 0 & 0 & 0 \\ 0 & 0 & 0 \end{bmatrix} * R_w^c$$

where $K_{intr}$ represents an internal parameter matrix of the PTZ camera, R represents a radius of the sphere, z represents a Z-axis coordinate of the tracking target 300 in the camera coordinate system, and $$R_w^c$$

represents a rotation matrix from the world coordinate system to the camera coordinate system.

Step S52: The target position of the tracking target 300 at the next time is updated based on the EKF algorithm according to the first Jacobian matrix and the second Jacobian matrix.

Specifically, referring to FIG. 7, FIG. 7 is a detailed flowchart of step S52 in FIG. 6.

As shown in FIG. 7, step S52: the target position of the tracking target 300 at the next time is updated based on the EKF algorithm according to the first Jacobian matrix and the second Jacobian matrix, including:

Step S521: In the predicting stage, the state vector corresponding to the initial position of the tracking target 300 at the current moment is taken as an estimated value of an EKF, and a predicted value of the target position of the tracking target 300 at the next time is estimated according to prediction equations, where the prediction equations include a state vector equation and a covariance equation.

Specifically, the EKF algorithm includes a predicting stage and an updating stage. The core idea of the EKF algorithm is prediction and measurement feedback, and the EKF algorithm consists of two parts, where the first part is a state prediction equation, and the second part is an observation equation. In the predicting stage, the predicted value computed by a system state equation is used as prior information, and then, the prior information is updated again in the observation part.

In the predicting stage, prediction equations include a state vector equation and a covariance equation which are respectively:

$$\begin{cases} x(k+1) = Fx(k) \\ P(k+1) = FP(k)F^T + Q \end{cases},$$

where x(k+1) represents a predicted value of the state vector corresponding to the position of the tracking target 300 at the next time, that is, estimated target position of the tracking target 300 at the next time, x(k) represents a measured value of the state vector corresponding to the position of the tracking target 300 at the current moment, F represents a system state transition matrix, P(k+1) represents a covariance predicted value, P(k) represents a covariance measured value, $F^T$ represents a transposed matrix of the system state transition matrix, and Q represents a noise matrix.

In the embodiments of the present disclosure, the system state transition matrix F may be $$F = \begin{bmatrix} 1, 0, 0, dt, 0, 0 \\ 0, 1, 0, 0, dt, 0 \\ 0, 0, 1, 0, 0, dt \\ 0, 0, 0, 1, 0, 0 \\ 0, 0, 0, 0, 1, 0 \\ 0, 0, 0, 0, 0, 1 \end{bmatrix}$$

Step S522: In the updating stage, a Kalman gain is computed according to the first Jacobian matrix and the second Jacobian matrix.

Specifically, the Kalman gain is $K=P(k+1)J^T(HP(k+1)H^T+R)^{-1}$, where P(k+1) represents a covariance predicted value, $J^T$ represents a transposed matrix of the first Jacobian matrix or the second Jacobian matrix, H represents a transition matrix from state to observation, P(k+1) represents a covariance predicted value, $H^T$ represents a transposed matrix of the transition matrix from state to observation, and R represents a measurement noise variance.

The $J^T$ represents a transposed matrix of the first Jacobian matrix or the second Jacobian matrix. Specifically, for the height of the target box, the $J^T$ represents the first Jacobian matrix $J_h$, that is, $$J^T = J_h = K_{intr} * \begin{bmatrix} 0 & 0 & 0 \\ 0 & 0 & -\frac{2R}{z^2} \\ 0 & 0 & 0 \end{bmatrix} * R_W^c,$$

and at this time, the computed Kalman gain is a first Kalman gain. Specifically, a first Kalman gain is determined according to the first Jacobian matrix, specifically including:

a first Kalman gain $K1=P(k+1)J_h^T(HP(k+1)H^T+R)^{-1}$ is determined, where P(k+1) represents a covariance predicted value, $J_h^T$ represents a transposed matrix of the first Jacobian matrix, H represents a transition matrix from state to observation, $H^T$ represents a transposed matrix of the transition matrix from state to observation, and R represents a measurement noise variance.

Specifically, for the width of the target box, the $J^T$ represents the second Jacobian matrix $J_w$, that is, $$J^T = J_w = K_{intr} * \begin{bmatrix} 0 & 0 & -\frac{2R}{z^2} \\ 0 & 0 & 0 \\ 0 & 0 & 0 \end{bmatrix} * R_W^c,$$

and at this time, the computed Kalman gain is a second Kalman gain. Specifically, a second Kalman gain is determined according to the second Jacobian matrix, specifically including:

a second Kalman gain K2=P(k+1)$J_w^T$(HP(k+1)$H^T$+R)$^{-1}$ is determined, where P(k+1) represents a covariance predicted value, $J_h^T$ represents a transposed matrix of the second Jacobian matrix, H represents a transition matrix from state to observation, $H^T$ represents a transposed matrix of the transition matrix from state to observation, and R represents a measurement noise variance.

Step S523: The prediction equations are updated according to the Kalman gain, the estimated value and the predicted value, updated prediction equations are determined, and updated values are obtained.

Specifically, the prediction equations are updated according to the first Kalman gain, the second Kalman gain, the measured value and the predicted value, updated prediction equations are determined, and updated values are obtained.

Specifically, the updated prediction equations are:

$$\begin{cases} x(k+1) = x(k+1) + K(z_{measurement} - z_{prediction}) \\ P(k+1) = (I - KH)P(k+1) \end{cases},$$

where x(k+1) represents a predicted value of the state vector corresponding to the position of the tracking target 300 at the next time, K represents a Kalman gain, $z_{measurement}$ represents a measured value of the height of the target box in the image represented by the first Jacobian matrix $J_h$ or a measured value of the width of the target box in the image represented by the second Jacobian matrix $J_w$, $z_{prediction}$ represents a predicted value of an estimated height and an estimated width of the tracking target 300 in the image, P(k+1) represents a covariance predicted value, and H represents a transition matrix from state to observation.

When the $z_{measurement}$ represents a measured value of the height of the target box in the image represented by the first Jacobian matrix $J_h$, the Kalman gain K is a first Kalman gain K1, and at this time, $z_{prediction}$=|$v_b$−$v_a$|, where $v_b$ represents a vertical coordinate of the highest point b of the target box in the pixel coordinate system, and $v_a$ represents a vertical coordinate of the lowest point a of the target box in the pixel coordinate system.

When the $z_{measurement}$ represents a measured value of the width of the target box in the image represented by the second Jacobian matrix $J_w$, the Kalman gain K is a second Kalman gain K2, and at this time, $z_{prediction}$=|$v_d$−$v_c$|, where $v_d$ represents a vertical coordinate of the rightmost point d of the target box in the pixel coordinate system, and $v_c$ represents a vertical coordinate of the leftmost point c of the target box in the pixel coordinate system.

By respectively determining the measured value of the height of the target box and the measured value of the width of the target box, and respectively using the first Kalman gain K1 and the second Kalman gain K2, a predicted value x(k+1) of the state vector corresponding to the position of the tracking target 300 at the next time is determined, that is, $$x(k+1) = x(k+1) + K1\left(z_{measurement}^h - |v_b - v_a|\right) + K2(z_{measurement}^w - |v_d - v_c|),$$

where x(k+1) represents a predicted value of the state vector corresponding to the position of the tracking target 300 at the next time, K1 represents a first Kalman gain, K2 represents a second Kalman gain, $$z_{measurement}^h$$

represents a measured value of the height of the target box in the image represented by the first Jacobian matrix $$J_h, z_{measurement}^w$$

represents a measured value of the width of the target box in the image represented by the second Jacobian matrix $J_w$, $v_b$ represents a vertical coordinate of the highest point b of the target box in the pixel coordinate system, $v_a$ represents a vertical coordinate of the lowest point a of the target box in the pixel coordinate system, $v_d$ represents a vertical coordinate of the rightmost point d of the target box in the pixel coordinate system, and $v_c$ represents a vertical coordinate of the leftmost point c of the target box in the pixel coordinate system.

In the embodiments of the present disclosure, by respectively computing the updated values of the length and width of the target box, a predicted value of the state vector corresponding to the position of the tracking target 300 at the next time is determined, thereby being helpful to better estimate the position of the tracking target 300.

Step S524: The target position of the tracking target 300 at the next time is updated according to the updated values.

Specifically, after the updated prediction equations are determined, the updated values obtained in the updating stage are substituted into the prediction equations in the predicting stage to estimate the target position of the tracking target 300 at the next time. Specifically, the updated x(k+1) as x(k) and P(k+1) as P(k) are substituted into the prediction equations $$\begin{cases} x(k+1) = Fx(k) \\ P(k+1) = FP(k)F^T + Q \end{cases}$$

to obtain a predicted state quantity of the tracking target 300, and the state quantity is taken as the target position of the tracking target 300 at the next time, thereby obtaining the target position of the tracking target 300 at the next time.

In the embodiments of the present disclosure, the method further includes:

the updated position information is taken as the estimated target position to iteratively update the target position of the tracking target 300 at the next time.

Specifically, the updated position information is taken as the estimated target position, the step of determining an estimated width and an estimated height of the tracking target 300 in the image according to the estimated target position and the following steps are repeated to iteratively update the target position of the tracking target 300 at the next time, and the iteration process is stopped until an error is less than a preset threshold by convergence. By means of iteration, the present disclosure can better converge the estimated target position to the actual position.

In the embodiments of the present disclosure, the position estimation method for a tracking target is implemented in an unmanned aerial vehicle 100, the unmanned aerial vehicle 100 includes a PTZ camera, and the PTZ camera is configured to obtain an image. The method includes: the target position of the tracking target 300 at the next time is estimated according to the initial position of a given tracking target 300 at the current moment; an estimated width and an estimated height of the tracking target in the image are determined according to the estimated target position; an actual width and an actual height of the tracking target 300 in the image are obtained; the height difference and the width difference are determined according to the estimated width and estimated height and the actual height and actual width; and the target position of the tracking target 300 at the next time is updated according to the height difference and the width difference. By computing the height difference and the width difference of the tracking target 300 in the image, the target position of the tracking target 300 at the next time is updated, so that the present disclosure can achieve the purpose of stably estimating the position of the tracking target 300.

Figures 8, 9:
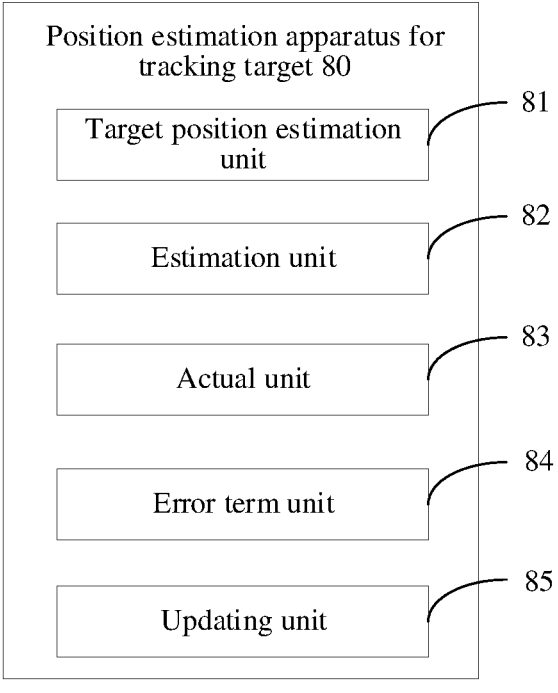
FIG. 8 is a schematic structural diagram of a position estimation apparatus for a tracking target provided in an embodiment of the present disclosure.
FIG. 9 is a schematic diagram of hardware structures of a controller of a tracking system of an unmanned aerial vehicle provided in an embodiment of the present disclosure.

Referring to FIG. 8, FIG. 8 is a schematic structural diagram of a position estimation apparatus for a tracking target 300 provided in an embodiment of the present disclosure.

The position estimation apparatus for a tracking target 300 is used for an unmanned aerial vehicle 100, the unmanned aerial vehicle 100 includes a PTZ camera, and the PTZ camera is configured to obtain an image. As shown in FIG. 8, a position estimation apparatus 80 for a tracking target 300 includes:

a target position estimation unit 81, configured to estimate the target position of the tracking target 300 at the next time according to the initial position of the tracking target 300 at the current moment;

an estimation unit 82, configured to determine an estimated width and an estimated height of the tracking target 300 in the image according to the estimated target position;

an actual unit 83, configured to obtain an actual width and an actual height of the tracking target 300 in the image;

an error term unit 84, configured to determine a height difference between the estimated width and the estimated height, and a width difference between the actual height and actual width; and an updating unit 85, configured to update the target position of the tracking target 300 at the next time according to the height difference and the width difference.

In the embodiments of the present disclosure, the estimation unit is specifically configured to:

model the tracking target 300, determine a model corresponding to the tracking target 300, and determine a target box of the tracking target 300 in the image according to the model corresponding to the tracking target 300.

In the embodiments of the present disclosure, the estimation unit is specifically configured to:

model the tracking target 300 as a sphere, and determine a radius R of the sphere corresponding to the tracking target 300 according to the length, width and height of the tracking target 300; and determine a target box corresponding to the sphere corresponding to the tracking target 300 in the image.

In the embodiments of the present disclosure, the estimation unit includes:

a camera position module, configured to determine camera position information of the tracking target 300 in a camera coordinate system according to the estimated target position, where the estimated target position is world position information in a world coordinate system; and a pixel position module, configured to determine pixel position information of the tracking target 300 in a pixel coordinate system according to the camera position information of the tracking target 300 in the camera coordinate system.

In the embodiments of the present disclosure, the camera position module is specifically configured to:

assuming that the estimated target position is $P_{world}=(p_x, p_y, p_z)$, determine that a state vector corresponding to the estimated target position is $$X = P_{world}^T,$$

and the camera position of the tracking target 300 in the camera coordinate system is $$P_{cam} = R_w^c * P_{world}^T + t,$$

where $P_{cam}=(x, y, z)^T$ represents three-dimensional coordinates of the tracking target 300 in the camera coordinate system, $$R_w^c$$

represents a rotation matrix from the world coordinate system to the camera coordinate system, and t represents a translation vector from the world coordinate system to the camera coordinate system.

In the embodiments of the present disclosure, the pixel position module is specifically configured to:

assuming that the pixel position information of the tracking target 300 in the pixel coordinate system is $p=(u, v)^T$, determine that $$p = K_{intr} * P_{cam} * \frac{1}{p_z},$$

where $K_{intr}$ represents an internal parameter matrix of the PTZ camera, $P_{cam}$ represents three-dimensional coordinates of the tracking target 300 in the camera coordinate system, and $p_z$ represents three-dimensional coordinates of the tracking target 300 in the world coordinate system.

In the embodiments of the present disclosure, the internal parameter matrix of the PTZ camera is $$K_{intr} = \begin{bmatrix} f_x & 0 & c_x \\ 0 & f_y & c_y \end{bmatrix},$$

where $(f_x, f_y)$ represents focal lengths of the PTZ camera, and $(c_x, c_y)$ represents principal point coordinates.

In some embodiments, the estimation unit includes:

a height estimation module, configured to determine an estimated height of the target box in the image according to the highest point and lowest point of the target box in a longitudinal axis direction; and a width estimation unit, configured to determine an estimated width of the target box in the image according to the leftmost point and rightmost point of the target box in a horizontal axis direction.

In the embodiments of the present disclosure, the height estimation module is specifically configured to:

assuming that the highest point of the target box of the tracking target 300 in the image in the longitudinal axis direction is a, the lowest point is b, a tangent point of the sphere corresponding to the highest point a is A, a tangent point of the sphere corresponding to the lowest point b is B, pixel coordinates of the tangent point A in the pixel coordinate system are $(u_a, v_a)$, pixel coordinates of the tangent point B in the pixel coordinate system are $(u_b, v_b)$, and a height difference between the highest point a and the lowest point b is height, determine that an estimated height of the target box in the image is $$height = K_{intr} * \begin{bmatrix} 0 \\ 2R \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target 300 in the camera coordinate system.

In the embodiments of the present disclosure, the width estimation unit is specifically configured to:

assuming that the leftmost point of the target box of the tracking target 300 in the image in the horizontal axis direction is c, the rightmost point is d, a tangent point of the sphere corresponding to the leftmost point c is C, a tangent point of the sphere corresponding to the rightmost point d is D, pixel coordinates of the tangent point C in the pixel coordinate system are $(u_c, v_c)$, pixel coordinates of the tangent point D in the pixel coordinate system are $(u_d, v_d)$, and a width difference between the leftmost point c and the rightmost point d is width, determine that an estimated width of the target box in the image is $$width = K_{intr} * \begin{bmatrix} 2R \\ 0 \\ 0 \end{bmatrix} * \frac{1}{z},$$

where $K_{intr}$ represents an internal parameter matrix of the PTZ camera, R represents a radius of the sphere, and z represents a Z-axis coordinate of the tracking target 300 in the camera coordinate system.

In the embodiments of the present disclosure, the updating unit is specifically configured to:

determine a first Jacobian matrix of the estimated height to the state vector of the tracking target 300 and a second Jacobian matrix of the estimated width to the state vector of the tracking target 300 according to the estimated height and estimated width of the tracking target 300 in the image, where the state vector is a transposed matrix of the estimated target position; and update the target position of the tracking target 300 at the next time based on the EKF algorithm according to the first Jacobian matrix and the second Jacobian matrix.

In the embodiments of the present disclosure, the first Jacobian matrix is $$J_h = K_{intr} * \begin{bmatrix} 0 & 0 & 0 \\ 0 & 0 & -\frac{2R}{z^2} \\ 0 & 0 & 0 \end{bmatrix} * R_w^c,$$

and the second Jacobian matrix is $$J_w = K_{intr} * \begin{bmatrix} 0 & 0 & -\frac{2R}{z^2} \\ 0 & 0 & 0 \\ 0 & 0 & 0 \end{bmatrix} * R_w^c,$$

where $K_{intr}$ represents an internal parameter matrix of the PTZ camera, R represents a radius of the sphere, and z represents a Z-axis coordinate of the tracking target 300 in the camera coordinate system.

In the embodiments of the present disclosure, the EKF algorithm includes a predicting stage and an updating stage, and the updating unit is specifically configured to:

in the predicting stage, take the state vector corresponding to the initial position of the tracking target 300 at the current moment as an estimated value of an EKF, and estimate a predicted value of the target position of the tracking target 300 at the next time according to prediction equations, where the prediction equations include a state vector equation and a covariance equation;

in the updating stage, compute a Kalman gain according to the first Jacobian matrix and the second Jacobian matrix;

update the prediction equations according to the Kalman gain, the estimated value and the predicted value, determine updated prediction equations, and obtain updated values; and update the target position of the tracking target 300 at the next time according to the updated values.

In the embodiments of the present disclosure, the prediction equations are:

$$\begin{cases} x(k+1) = Fx(k) \\ P(k+1) = FP(k)F^T + Q \end{cases},$$

where x(k+1) represents a predicted value of the state vector corresponding to the position of the tracking target 300 at the next time, x(k) represents an estimated value of the state vector corresponding to the position of the tracking target 300 at the current moment, F represents a system state transition matrix, P(k+1) represents a covariance predicted value, P(k) represents a covariance estimated value, $F^T$ represents a transposed matrix of the system state transition matrix, and Q represents a noise matrix.

In the embodiments of the present disclosure, the Kalman gain is $K=P(k+1)J^T(HP(k+1)H^T+R)^{-1}$, where P(k+1) represents a covariance predicted value, $J^T$ represents a transposed matrix of the first Jacobian matrix or the second Jacobian matrix, H represents a transition matrix from state to observation, P(k+1) represents a covariance predicted value, $H^T$ represents a transposed matrix of the transition matrix from state to observation, and R represents a measurement noise variance.

In the embodiments of the present disclosure, the updated prediction equations are:

$$\begin{cases} x(k+1) = x(k+1) + K(z_{measurement} - z_{predication}) \\ \qquad P(k+1) = (I - KH)P(k+1) \end{cases},$$

where x(k+1) represents a predicted value of the state vector corresponding to the target position of the tracking target 300 at the next time, K represents a Kalman gain, $z_{measurement}$ represents a measured value of the height or the width of the target box, $z_{prediction}$ represents a predicted value of the height of the target box represented by the first Jacobian matrix $J_h$ or a predicted value of the width of the target box represented by the second Jacobian matrix $J_w$, P(k+1) represents a covariance predicted value, and H represents a transition matrix from state to observation.

In the embodiments of the present disclosure, the updating unit is specifically configured to:

substitute the updated values obtained in the updating stage into the prediction equations in the predicting stage to update the target position of the tracking target 300 at the next time.

In the embodiments of the present disclosure, the apparatus further includes:

an iteration unit, configured to take the updated position information as the estimated target position to iteratively update the target position of the tracking target 300 at the next time.

It should be noted that, the foregoing apparatus can perform the methods provided in the embodiments of this application, and has corresponding functional modules and beneficial effects of an implementation method. The technical details which are not described in detail in the apparatus embodiment may refer to the methods provided in the embodiments of this application.

In the embodiments of the present disclosure, the position estimation apparatus for a tracking target 300 is implemented in an unmanned aerial vehicle 100. The unmanned aerial vehicle 100 includes a PTZ camera, and the PTZ camera is configured to obtain an image. The apparatus includes: a target position estimation unit, configured to estimate the target position of the tracking target 300 at the next time according to the initial position of the tracking target 300 at the current moment; an estimation unit, configured to determine an estimated width and an estimated height of the tracking target 300 in the image according to the estimated target position; an actual unit, configured to obtain an actual width and an actual height of the tracking target 300 in the image; an error term unit, configured to determine e a height difference between the estimated width and the estimated height, and a width difference between the actual height and the actual width; and an updating unit, configured to update the target position of the tracking target 300 at the next time according to the height difference and the width difference. By computing the height difference and the width difference of the tracking target 300 in the image, the target position of the tracking target 300 at the next time is updated, so that the present disclosure can achieve the purpose of stably estimating the position of the tracking target 300.

Referring to FIG. 9, FIG. 9 is a schematic diagram of hardware structures of a controller of a tracking system of the unmanned aerial vehicle 100 provided in an embodiment of the present disclosure.

As shown in FIG. 9, the controller 31 includes: one or more processors 31a and a memory 31b. In FIG. 9, one processor 31a is taken as an example.

The processor 31a and the memory 31b may be connected by a bus or other means. For example, in FIG. 9, the processor 31a and the memory 31b are connected by a bus.

The processor 31a is configured to estimate the target position of the tracking target 300 at the next time according to the initial position of the tracking target 300 at the current moment; determine an estimated width and an estimated height of the tracking target 300 in the image according to the estimated target position; obtain an actual width and an actual height of the tracking target 300 in the image; determine a height difference between the estimated width and the estimated height, and width difference between the actual height and the actual width; and update the target position of the tracking target 300 at the next time according to the height difference and the width difference.

As a non-volatile computer-readable storage medium, the memory 31b may be used for storing non-volatile software programs and non-volatile computer executable programs and modules, such as program instructions/modules corresponding to the position estimation method for the tracking target 300 in the embodiments of this application. The processor 31a executes various functional applications and data processing of the controller by running non-volatile software programs, instructions and modules stored in the memory 31b, thereby implementing the position estimation method for the tracking target 300 in the foregoing method embodiments.

The memory 31b may include a program storage area and a data storage area, where the program storage area may store application programs required by an operating system and at least one function; and the data storage area may store the data created according to the use of the controller, and the like. In addition, the memory 31b may include a high-speed random access memory, and may further include a non-volatile memory, such as at least one disk memory, a flash memory, or another non-volatile solid-state memory. In some embodiments, the memory 31b optionally includes memories remotely arranged relative to the processor 31a, and these remote memories may be connected to the controller through a network. Examples of the network include, but are not limited to, the Internet, an intranet, a local area network, a mobile communication network, and a combination thereof.

The one or more modules are stored in the memory 31b, and when the one or more modules are executed by the one or more processors 31a, the position estimation method for a tracking target in any of the foregoing method embodiments may be performed, for example, step S10 to step S50 of the method in FIG. 4 described above may be performed; and the functions of the modules in FIG. 8 may be realized.

It should be noted that, the foregoing product can perform the methods provided in the embodiments of this application, and has corresponding functional modules and beneficial effects of an implementation method. The technical details which are not described in detail in this embodiment may refer to the methods provided in the embodiments of this application.

An embodiment of this application provides a non-transitory computer-readable storage medium. The computer-readable storage medium stores computer executable instructions, and the computer executable instructions may be executed by one or more processors, such as a processor 31a in FIG. 9, so that the position estimation method for a tracking target in any of the foregoing method embodiments may be performed by the one or more processors, for example, step S10 to step S50 of the method in FIG. 4 described above may be performed; and the functions of the modules in FIG. 8 may be realized.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. When the program is executed, the processes of the foregoing method embodiments may be included. The storage medium may be a magnetic disk, an optical disc, a read-only memory (ROM), a random access memory (RAM), or the like.

Finally, it should be noted that: the foregoing embodiments are merely used for describing the technical solutions of the present disclosure, but are not intended to limit the present disclosure. Under the ideas of the present disclosure, the technical features in the foregoing embodiments or different embodiments may also be combined, the steps may be performed in any order, and many other changes of different aspects of the present disclosure also exists as described above, and these changes are not provided in detail for simplicity. Although the present disclosure is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the present disclosure.

What is claimed is:

1. A position estimation method for a tracking target, implemented in an unmanned aerial vehicle, the unmanned aerial vehicle comprising a pan-tilt-zoom (PTZ) camera, and the PTZ camera being configured to capture images in front of the unmanned aerial vehicle, wherein the method comprises:

estimating a target position of the tracking target at the next time according to an initial position of the tracking target at the current moment;

determining an estimated width and an estimated height of the tracking target in an image captured by the PTZ camera according to an estimated target position of the tracking target;

obtaining an actual width and an actual height of the tracking target in the image;

determining a height difference between the estimated width and the estimated height, and determining a width difference between the actual height and the actual width; and updating the target position of the tracking target at the next time according to the height difference and the width difference;

wherein the determining an estimated width and an estimated height of the tracking target in the image according to an estimated target position of the tracking target comprises:

modeling the tracking target, determining a model corresponding to the tracking target, and determining a target box of the tracking target in the image according to the model corresponding to the tracking target.

2. The method according to claim 1, wherein the modeling the tracking target, determining a model corresponding to the tracking target, and determining a target box of the tracking target in the image according to the model corresponding to the tracking target comprises:

modeling the tracking target as a sphere, and determining a radius R of the sphere corresponding to the tracking target according to the length, width and height of the tracking target; and determining a target box corresponding to the sphere corresponding to the tracking target in the image.

3. The method according to claim 2, wherein the determining an estimated width and an estimated height of the tracking target in the image according to the estimated target position of the tracking target comprises:

determining a camera position of the tracking target in a camera coordinate system according to the estimated target position, wherein the estimated target position is a world position in a world coordinate system; and determining a pixel position of the tracking target in a pixel coordinate system according to the camera position of the tracking target in the camera coordinate system.

4. The method according to claim 3, wherein the determining camera position of the tracking target in a camera coordinate system according to the estimated target position comprises:

assuming that the estimated target position is $P_{world}=(p_x, p_y, p_z)$, determining that a state vector corresponding to the estimated target position is $$X = P_{world}^T,$$

and the camera position of the tracking target in the camera coordinate system is $$P_{cam} = R_w^c * P_{world}^T + t,$$

wherein $P_{cam}=(x, y, z)^T$ represents three-dimensional coordinates of the tracking target in the camera coordinate system, $$R_w^c$$

represents a rotation matrix from the world coordinate system to the camera coordinate system, and t represents a translation vector from the world coordinate system to the camera coordinate system.

5. The method according to claim 4, wherein the determining pixel position of the tracking target in a pixel coordinate system according to the camera position of the tracking target in the camera coordinate system comprises:

assuming that the pixel position of the tracking target in the pixel coordinate system is $p=(u, v)^T$, determining that $$p = K_{intr} * P_{cam} * \frac{1}{p_z},$$

wherein $K_{intr}$ represents an internal parameter matrix of the PTZ camera, $P_{cam}$ represents three-dimensional coordinates of the tracking target in the camera coordinate system, and $p_z$ represents three-dimensional coordinates of the tracking target in the world coordinate system.

6. The method according to claim 5, wherein the internal parameter matrix of the PTZ camera is $$K_{intr} = \begin{bmatrix} f_x & 0 & c_x \\ 0 & f_y & c_y \end{bmatrix},$$

wherein $(f_x, f_y)$ represents focal lengths of the PTZ camera, and $(c_x, c_y)$ represents principal point coordinates.

7. The method according to claim 6, wherein the determining an estimated width and an estimated height of the tracking target in the image comprises:

determining an estimated height and an estimated width of the target box in the image respectively according to the highest point and lowest point of the target box in a longitudinal axis direction and the leftmost point and rightmost point of the target box in a horizontal axis direction.

8. The method according to claim 7, wherein the determining an estimated height of the target box in the image comprises:

assuming that the highest point of the target box of the tracking target in the image in the longitudinal axis direction is a, the lowest point is b, a tangent point of the sphere corresponding to the highest point a is A, a tangent point of the sphere corresponding to the lowest point b is B, pixel coordinates of the tangent point A in the pixel coordinate system are $(u_a, v_a)$, pixel coordinates of the tangent point B in the pixel coordinate system are $(u_b, v_b)$, and a height difference between the highest point a and the lowest point b is height, determining that an estimated height of the target box in the image is $$\text{height} = K_{intr} * \begin{bmatrix} 0 \\ 2R \\ 0 \end{bmatrix} * \frac{1}{z},$$

wherein $K_{intr}$ represents an internal parameter matrix of the PTZ camera, R represents a radius of the sphere, and z represents a Z-axis coordinate of the tracking target in the camera coordinate system.

9. The method according to claim 7, wherein the determining an estimated width of the target box in the image comprises:

assuming that the leftmost point of the target box of the tracking target in the image in the horizontal axis direction is c, the rightmost point is d, a tangent point of the sphere corresponding to the leftmost point c is C, a tangent point of the sphere corresponding to the rightmost point d is D, pixel coordinates of the tangent point C in the pixel coordinate system are $(u_c, v_c)$, pixel coordinates of the tangent point D in the pixel coordinate system are $(u_d, v_d)$, and a width difference between the leftmost point c and the rightmost point d is width, determining that an estimated width of the target box in the image is $$\text{width} = K_{intr} * \begin{bmatrix} 2R \\ 0 \\ 0 \end{bmatrix} * \frac{1}{z},$$

wherein $K_{intr}$ represents an internal parameter matrix of the PTZ camera, R represents a radius of the sphere, and z represents a Z-axis coordinate of the tracking target in the camera coordinate system.

10. The method according to claim 1, wherein the updating the target position of the tracking target at the next time according to the height difference and the width difference comprises:

updating the target position of the tracking target at the next time based on an extended Kalman filter (EKF) algorithm according to the height difference and the width difference.

11. The method according to claim 10, wherein the updating the target position of the tracking target at the next time based on an EKF algorithm according to the height difference and the width difference comprises:

determining a first Jacobian matrix of the estimated height to the state vector of the tracking target and a second Jacobian matrix of the estimated width to the state vector of the tracking target according to the estimated height and estimated width of the tracking target in the image, wherein the state vector is a transposed matrix of the estimated target position; and updating the target position of the tracking target at the next time based on the EKF algorithm according to the first Jacobian matrix and the second Jacobian matrix.

12. The method according to claim 11, wherein the first Jacobian matrix is, $$J_h = K_{intr} * \begin{bmatrix} 0 & 0 & 0 \\ 0 & 0 & -\dfrac{2R}{z^2} \\ 0 & 0 & 0 \end{bmatrix} * R_w^c,$$

and the second Jacobian matrix is $$J_w = K_{intr} * \begin{bmatrix} 0 & 0 & -\dfrac{2R}{z^2} \\ 0 & 0 & 0 \\ 0 & 0 & 0 \end{bmatrix} * R_w^c,$$

wherein $K_{intr}$ represents an internal parameter matrix of the PTZ camera, R represents a radius of the sphere, and z represents a Z-axis coordinate of the tracking target in the camera coordinate system.

13. The method according to claim 12, wherein the EKF algorithm comprises a predicting stage and an updating stage, and the updating the target position of the tracking target at the next time based on the EKF algorithm according to the first Jacobian matrix and the second Jacobian matrix comprises:

in the predicting stage, taking the state vector corresponding to the initial position of the tracking target at the current moment as an estimated value of an EKF, and estimating a predicted value of the target position of the tracking target at the next time according to prediction equations, wherein the prediction equations comprise a state vector equation and a covariance equation;

in the updating stage, computing a Kalman gain according to the first Jacobian matrix and the second Jacobian matrix;

updating the prediction equations according to the Kalman gain, the estimated value and the predicted value, determining updated prediction equations, and obtaining updated values; and updating the target position of the tracking target at the next time according to the updated values.

14. The method according to claim 13, wherein the prediction equations are:

$$\begin{cases} x(k+1) = Fx(k) \\ P(k+1) = FP(k)F^T + Q \end{cases},$$

wherein x(k+1) represents a predicted value of the state vector corresponding to the position of the tracking target at the next time, x(k) represents an estimated value of the state vector corresponding to the position of the tracking target at the current moment, F represents a system state transition matrix, P(k+1) represents a covariance predicted value, P(k) represents a covariance estimated value, $F^T$ represents a transposed matrix of the system state transition matrix, and Q represents a noise matrix.

15. The method according to claim 14, wherein the computing a Kalman gain according to the first Jacobian matrix and the second Jacobian matrix comprises:

computing a Kalman gain $K=P(k+1)J^T(HP(k+1)H^T+R)^{-1}$, wherein P(k+1) represents a covariance predicted value, $J^T$ represents a transposed matrix of the first Jacobian matrix or the second Jacobian matrix, H represents a transition matrix from state to observation, P(k+1) represents a covariance predicted value, $H^T$ represents a transposed matrix of the transition matrix from state to observation, and R represents a measurement noise variance.

16. The method according to claim 15, wherein the updating the prediction equations according to the Kalman gain, the measured value and the predicted value, and determining updated prediction equations comprises:

determining updated prediction equations:

$$\begin{cases} x(k+1) = x(k+1) + K(z_{measurement} - z_{predication}) \\ P(k+1) = (I - KH)P(k+1) \end{cases},$$

wherein x(k+1) represents a predicted value of the state vector corresponding to the target position of the tracking target at the next time, K represents a Kalman gain, $z_{measurement}$ represents a measured value of the height or the width of the target box, $z_{prediction}$ represents a predicted value of the height of the target box represented by the first Jacobian matrix $J_h$ or a predicted value of the width of the target box represented by the second Jacobian matrix $J_w$, P(k+1) represents a covariance predicted value, and H represents a transition matrix from state to observation.

17. The method according to claim 16, wherein the updating the target position of the tracking target at the next time according to the updated prediction equations comprises:

substituting the updated values obtained in the updating stage into the prediction equations in the predicting stage to update the target position of the tracking target at the next time; and taking the updated position as the estimated target position to iteratively update the target position of the tracking target at the next time.

18. An unmanned aerial vehicle, comprising a fuselage, a pan-tilt-zoom (PTZ) camera, arms connected to the fuselage, power systems arranged on the arms, and a tracking system arranged on the fuselage, wherein the tracking system comprises a controller, and the controller comprises:

at least one processor; and a memory communicatively connected to the at least one processor, wherein the memory stores instructions executable by the at least one processor, and the instructions, when executed by the at least one processor, cause the at least one processor to perform a position estimation method for a tracking target, the method comprising:

estimating a target position of the tracking target at the next time according to an initial position of the tracking target at the current moment;

determining an estimated width and an estimated height of the tracking target in an image captured by the PTZ camera according to an estimated target position of the tracking target;

obtaining an actual width and an actual height of the tracking target in the image;

determining a height difference between the estimated width and the estimated height, and determining a width difference between the actual height and the actual width; and updating the target position of the tracking target at the next time according to the height difference and the width difference;

wherein the determining an estimated width and an estimated height of the tracking target in the image according to an estimated target position of the tracking target comprises:

modeling the tracking target, determining a model corresponding to the tracking target, and determining a target box of the tracking target in the image according to the model corresponding to the tracking target.

19. A non-transitory computer-readable storage medium, wherein the computer-readable storage medium stores computer executable instructions, and the computer executable instructions, when executed by an unmanned aerial vehicle, cause the unmanned aerial vehicle to perform a position estimation method for a tracking target, the method comprising:

estimating a target position of the tracking target at the next time according to an initial position of the tracking target at the current moment;

determining an estimated width and an estimated height of the tracking target in an image captured by a pan-tilt-zoom (PTZ) camera of the unmanned aerial vehicle according to an estimated target position of the tracking target;

obtaining an actual width and an actual height of the tracking target in the image;

determining a height difference between the estimated width and the estimated height, and determining a width difference between the actual height and the actual width; and updating the target position of the tracking target at the next time according to the height difference and the width difference;

wherein the determining an estimated width and an estimated height of the tracking target in the image according to an estimated target position of the tracking target comprises:

modeling the tracking target, determining a model corresponding to the tracking target, and determining a target box of the tracking target in the image according to the model corresponding to the tracking target.

\* \* \* \* \*